Figure 1:
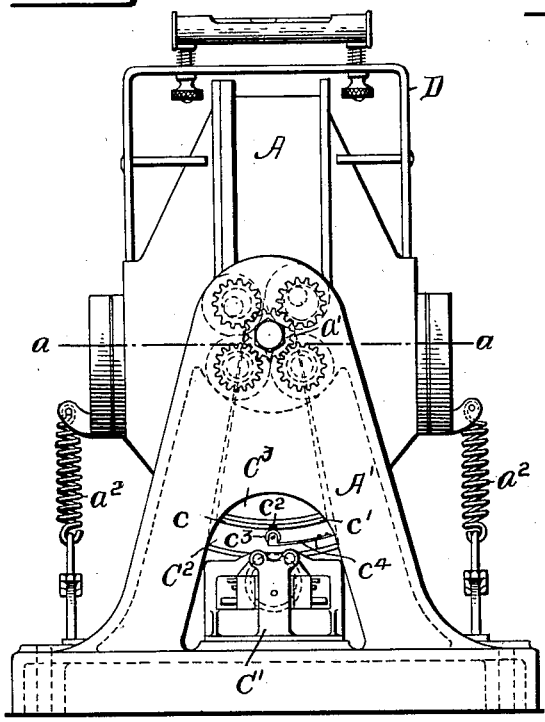

N. MINORSKY.
GYROMETER.
APPLICATION FILED JUNE 17, 1918.

1,306,552.

Patented June 10, 1919.
2 SHEETS—SHEET 1.

INVENTOR
Nicolai Minorsky.
BY
Herbert H. Thompson
his ATTORNEY.

INVENTOR
Nicolai Minorsky
BY
Herbert H. Thompson
his ATTORNEY

UNITED STATES PATENT OFFICE.

NICOLAI MINORSKY, OF PETROGRAD, RUSSIA, ASSIGNOR TO THE SPERRY GYROSCOPE COMPANY, OF BROOKLYN, NEW YORK, A CORPORATION OF NEW YORK.

GYROMETER.

1,306,552.  Specification of Letters Patent.  Patented June 10, 1919.

Application filed June 17, 1918. Serial No. 240,556.

*To all whom it may concern:*

Be it known that I, NICOLAI MINORSKY, a lieutenant in the Russian navy, residing at Maximilianovsky, Pereoulak 11, Petrograd, Russia, in the city of Petrograd and country of Russia, have invented certain new and useful Improvements in Gyrometers of which the following is a specification.

This invention relates to an improved method of and apparatus for steering ships, especially those of large tonnage, the invention giving a method of steering based on the principle known in other connections of measuring and indicating by suitable means the gyroscopic reaction or " force of precession" of a gyroscope mounted on the revolving body whose angular velocity is to be determined.

The invention has for one of its objects to indicate by suitable means the gyroscopic reaction or " force of precession " of a gyroscope mounted on the revolving body whose angular velocity is to be determined. The indicating means may comprise a scale graduated to give directly the values of the angular velocities so that it enables the officer and helmsman to ascertain at any moment the actual angular velocity of the yawing movement of the ship and to move the rudder so as to make the ship follow the desired course. In accordance with the present day practice, a ship is held on her course either by compass or bearings and the helmsman's only guide to the yawing of the ship is by observing with the eye the angle through which she swings. This angle varies from the minimum angle perceptible, say $\frac{1}{2}°$ up to possibly $2°$ according to the skill of the helmsman. With the magnetic compass this angle is more pronounced than with the gyroscopic compass, for the magnetic needle or card is carried through a small angle by inertia and the friction of the fluid and of the pivots. Only when the angle is large enough to be perceived does the helmsman check the vessel with the helm, by which time, owing to the enormous inertia of a vessel of large tonnage (for instance a modern battleship) this slow angular velocity has already caused considerable kinetic energy which can not be quickly checked. Thus even in the hands of the most skilful helmsman, the course held is only approximate to the true course, and the vessel consequently moves on a wavy or sinuous course as the helm is constantly moved more or less to port or to starboard of the true course.

Steering orders nowadays are given in terms of " angle of helm " which convey no idea of the " turning movement" of the ship, the ratio of angle of helm to the movement of the ship varying with each ship and in the same ship varying according to local conditions of wind, current, differences of draft, etc. Thus " $10°$ to port " is only an approximate order to the helmsman and has not exact relation to the movement of the ship. The navigating officer must wait until the action of the helm is felt, observe if the angle chosen by him is suitable for his purpose, and if not alter it again, causing loss of time and speed.

According to the invention the improved method of steering consists in measuring the gyroscopic reaction or force of precession of a gyroscope which is mounted on the ship and is so constructed and arranged as to be responsive to the yawing movements of the ship. The illustrated physical embodiment of the invention (which is designated a " gyrometer ") comprises a gyroscope having a casing which is free to swing against the resistance of a constantly acting force, about a horizontal axis preferably arranged transverse to a vertical plane containing the center line of the ship, and which is connected to an indicating device for indicating the gyroscopic reaction or force of precession of the gyroscope, when the ship yaws. The said apparatus enables the helmsman to note the first inception of an angular movement and check it accordingly, long before such movement would by the present-day methods become visible to the eye of the most experienced helmsman. In this manner a ship can be kept within fine limits of a dead course, with a corresponding decrease in the time taken by the ship in traveling between any two points. Furthermore, with the gyrometer in use orders will be given in terms of actual angular velocity of the ship and the helmsman will himself choose the angle of helm to give this result as shown by the indicator of the gyrometer mounted in front of him. Thus an order may be "10° per minute to port" or simply "10° to port" the officer keeping in mind that this is based on actual angular velocity and not on angle of helm. The helmsman will get this angular velocity in a minimum of time and hold it until further orders. With the gyrometer indicator and a ship's speed indicator under his eye the navigating officer will be able at all times to carry out tactical evolutions, pass fairways and make intricate passages with great accuracy.

In order that the said invention may be clearly understood and readily carried into effect I will describe the same more fully with reference to the accompanying drawings, in which:—

Figure 3:
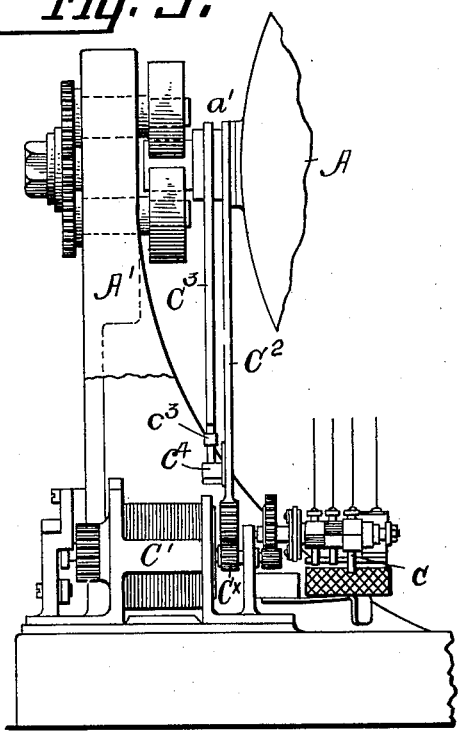
Figure 2:
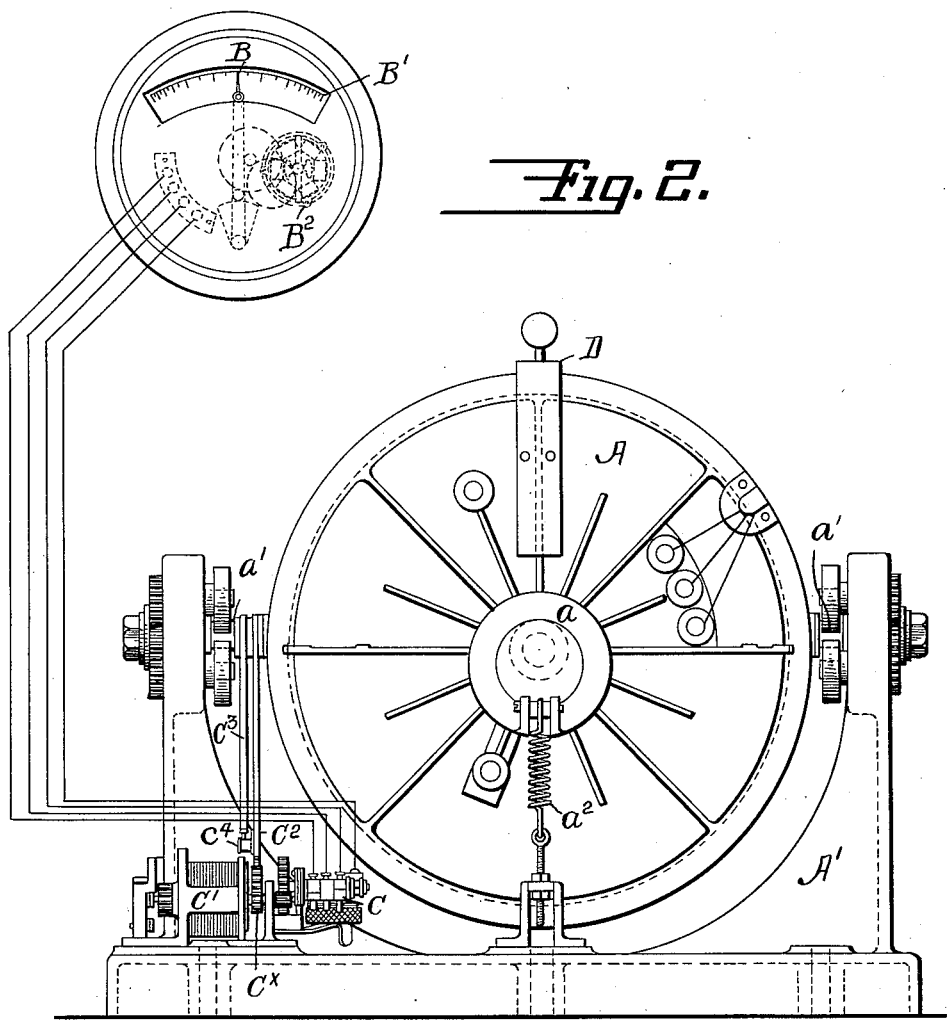

Figures 1 and 2 are respectively a side elevation and a rear elevation of a constructional form of my gyrometer as employed in connection with the steering of ships, and Fig. 3 is an enlarged view of part of Fig. 2.

The gyrometer comprises a gyro casing A containing a gyro-wheel whose axis of rotation is indicated by $a$. This gyro-casing is pivoted at $a'$, $a'$ to a frame A' which is mounted on the ship with the axis of rotation $a$ arranged preferably parallel to the center line of the ship. The gyro-casing is provided with two tension springs $a^2$, $a^2$ serving to normally maintain the axis of rotation $a$ horizontal. Thus when the ship on which the gyrometer is mounted commences to yaw the gyro-casing will move in one direction or the other, according to whether the yawing is to port or to starboard, about the axis of the pivots $a'$, $a'$ and against the resistance of one or the other of the tension springs $a^2$, $a^2$. As the extension of the said spring is proportional to the gyroscopic reaction or force of precession of the gyroscope, which in turn is proportional to the angular velocity of the ship, measurement of the angle through which the gyro-casing moves about the axis of the pivots $a'$, $a'$ will show the actual angular velocity of the ship. In the example shown this measurement is effected by a pointer B and a graduated scale B' the former being operated by a step-by-step motor $B^2$ controlled by a transmitting switch C which is diven by a motor C'. The latter motor drives an eccentrically mounted gear wheel $C^x$ meshing with a toothed quadrant $C^2$ loosely mounted on one of the pivots $a'$ of the gyro-casing. The gyro-casing has rigidly connected to it an arc $C^3$ provided with two contact segments $c$, $c'$ separated by an insulating strip $c^2$ with which a roller $c^3$ on a switch arm $C^4$ carried by the quadrant $C^2$ normally lies in contact. The said contact segments and the switch arm are so arranged in relation to the circuits of the motor C' that the latter will be rotated in one direction when the roller $c^3$ is in contact with the segment $c$ and in the other direction when the said roller is in contact with the segment $c'$. When the roller bears against the insulating strip $c^2$ the motor C' will, of course, not rotate. By these means the movements of the gyro-casing about the axis $a$ are indicated by the pointer B and the scale B' which may be situated some distance from the gyroscope. The eccentric arrangement of the gear wheel $C^x$ is for the purpose of enabling the graduations near the zero mark of the scale B' to be more widely spaced than those farther from the zero mark. Any other suitable means may be employed for indicating the said movements of the gyro-casing. In any case, however, as the angular movements of the gyro-casing are small, the means employed should be such as to make the smallest movement visible to the eye. The gyro-casing may carry a removable bracket D serving as a support for a spirit level which is used for initially adjusting the gyro-casing.

The arrangement of the two springs $a^2$, $a^2$ on opposite sides of the gyro-casing A, as distinguished from a single torsional device, enables the zero or resting position of the gyroscope to be adjusted independently of, or in combination with, the stress adjustment which limits the movement of the pointer over the scale. Either adjustment may be made without disturbing the accuracy or range of the other.

For the purpose of eliminating the effect of greater amplitude of roll the springs $a^2$, $a^2$ may be adjusted until the gyro axis is truly parallel to the axis of roll and accordingly in the zero position there will be no component at right angles to the plane of the wheel and the instrument then responds only to the lesser amplitude of yaw.

What I claim and desire to secure by Letters Patent of the United States is:—

1. A system for indicating movement of a vehicle about an axis comprising a gyro rotor, means for constraining said rotor to move about either or both of two axes at an angle to each other and to said first mentioned axis, means biasing the gyro to a normal position in which its precessional axis is normal to said first mentioned axis, an indicating element and variable ratio means connecting said gyro and indicating element.

2. A device for indicating movement of a vehicle in azimuth comprising in combination, a gyro rotor, means for constraining said rotor to move about either or both of two normally horizontal angularly disposed axes, a plurality of opposing adjustable resilient elements for opposing precession of said gyroscope and indicating means controlled by precession of said gyroscope.

In testimony whereof I have affixed my signature.

NICOLAI MINORSKY.